April 5, 1966 M. E. CROSLIN 3,244,324
VOLUMETRIC DISPENSING APPARATUS
Filed July 23, 1964 3 Sheets-Sheet 1
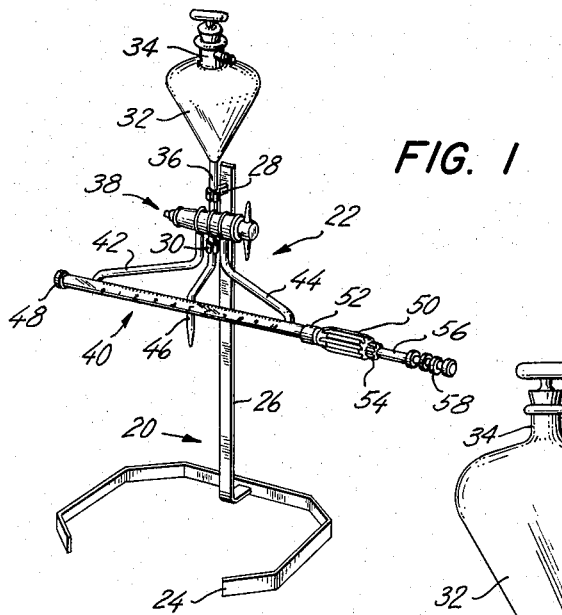
FIG. 1
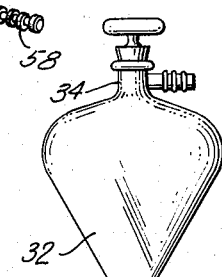
FIG. 2
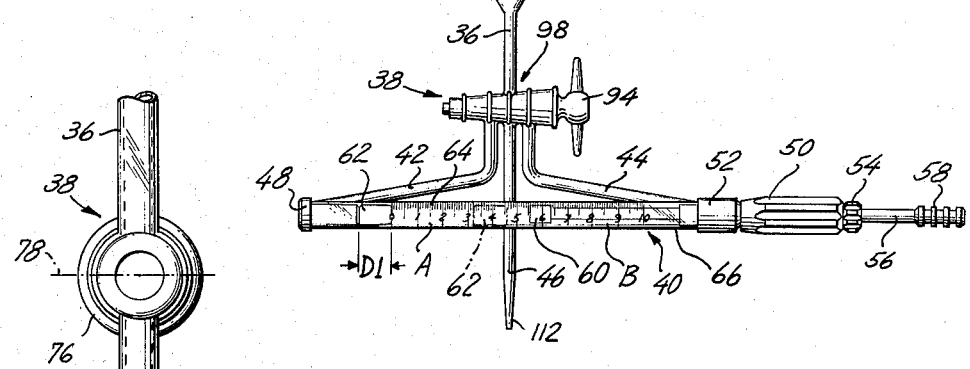
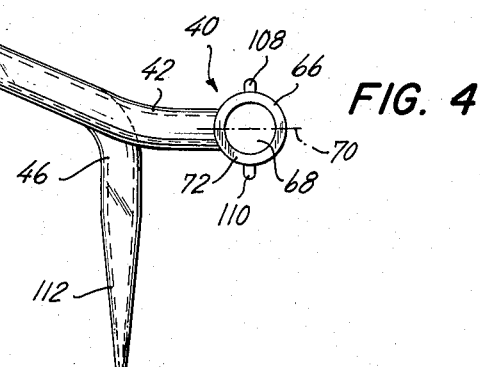
FIG. 4
INVENTOR
MICHAEL EMANUEL CROSLIN
BY
ATTORNEY April 5, 1966 M. E. CROSLIN 3,244,324
VOLUMETRIC DISPENSING APPARATUS
Filed July 23, 1964 3 Sheets-Sheet 3

INVENTOR
MICHAEL EMANUEL CROSLIN
BY
ATTORNEY

United States Patent Office 3,244,324
Patented Apr. 5, 1966

3,244,324
VOLUMETRIC DISPENSING APPARATUS
Michael E. Croslin, Forest Hills, N.Y., assignor to International Applied Science Laboratory, Inc., Hempstead, N.Y.
Filed July 23, 1964, Ser. No. 384,751
9 Claims. (Cl. 222—43)

This invention relates to volumetric dispensing devices and more particularly to automatic pipettes.

It is an object of the invention to provide an improved dimensionally stable volumetric dispensing apparatus.

Another object of the invention is to provide an improved automatic pipette.

Still another object of the invention is to provide an improved apparatus capable of dispensing accurately metered volumes of fluids or other dispensable substances.

Yet another object of the invention is to provide an improved volumetric dispensing apparatus comprising a calibrated chamber which is very easily read.

Another object of the invention is to provide an improved volumetric dispensing apparatus which can be readily fabricated with all necessary chambers incorporated therein so that it is unnecessary to add chambers to make the apparatus operable.

Still another object of the invention is to provide an improved volumetric dispensing apparatus completely capable of handling of all varieties of acids, alkalies and organic or inorganic solvents and in fact suitable for all laboratory reagents.

Also among the objects of the invention is the provision of an improved volumetric dispensing device having a rapid delivery which is insured because all of the chambers incorporated therein are maintained fully charged with fluid.

Yet another object of the invention is to provide an improved volumetric dispensing device which requires no special techniques or manipulations.

Another object of the invention is to provide an improved volumetric dispensing device the parts of which are easily removed for cleaning and/or autoclaving.

In achieving the above and other of its objectives, the invention contemplates the provision of a volumetric dispensing or metering apparatus which comprises a source of fluid under pressure such as, for example, a hydrostatic head. Associated therewith is a reciprocating means which includes two ports which are interchangeably operable as input and output ports. The reciprocating means is responsive to the receiving of a fluid under pressure by one of the aforesaid ports to discharge fluid via the other of the aforesaid ports and the reciprocating means is further adapted to store the fluid thusly received as a metered charge for subsequent delivery.

The invention further contemplates that the reciprocating means be adapted to discharge fluid in an amount equal to the amount of fluid received during a prior operation and that there be provided means for interchangeably connecting the aforesaid ports to the above-noted source and to an output means, there being further provided an adjustment coupled to the reciprocating means to limit accurately the amount of fluid which can be received and to control thereby the amount of fluid discharged.

More particularly, the invention contemplates an apparatus comprising a stand and a dispensing system whereof the stand may include a base with an upright thereon and adjustable clamping means provided on the upright, the dispensing system comprising, for example, a free floating piston which operates in connection with an adjustment device and a stop cock arrangement in a new and unique manner as will hereinafter be set forth in detail.

The dispensing system may comprise, for example, a vertical inlet conduit which is supported by the aforesaid clamping means and which is adapted for the gravitational supply of fluid although other alternative supplies may also be employed. A Pyrex chamber may be provided approximate the vertical inlet conduit, this chamber being in the form of a horizontal tube having a circular bore of predetermined diameter and defining an axis of symmetry and further having two oppositely disposed ends.

In acordance with the preferred embodiment of the invention, scale means are operatively associated with the above noted chamber and parallel to the axis of the same in a position intermeidate the ends thereof.

A first Teflon cap member is provided on one end of the tube and seals the same. This cap member preferably includes a plug which extends into the tube to a position short of the scale means by a determinable distance.

A free floating Pyrex piston, as generally noted above, is provided in the tube. It has a diameter corresponding to that of the aforesaid bore and is slidable in the bore. It divides the chamber into two sections in a substantially fluid-tight manner. The piston preferably has an axial length corresponding to the aforesaid determinable distance, such that it is adapted to fit exactly between the plug and scale means.

An adjustment device is provided with a Teflon cap member in accordance with the preferred embodiment of the invention, which cap member seals the other end of the tube. This cap member has a bore coaxial with the tube and includes a threaded extension disposed externally of the tube and on which is mounted an internally threaded Teflon barrel which threadably and adjustably engages this extension. On the Teflon barrel is provided an externally threaded cylindrical Teflon extension having a bore coaxial with the tube and further having diametral slots whereby to constitute an adjustable friction locking member. A Teflon locking nut is engaged on the cylindrical extension to compress the same to effect a locking operation.

A Teflon rod is provided in accordane with the invention which extends through the latter said cap member as well as through the barrel and the cylindrical extension, the rod being adjustably lockable within the cylindrical extension.

A knob provided on the aforesaid rod externally of the chamber permits adjusting the rod and adjusting thereby a Teflon stop which is mounted on the rod within the aforesaid chamber, the stop being adjusted relative to the aforesaid scale means. As will be explained in greater detail hereinafter, the adjustment relative to the scale means comprises both a coarse adjustment and a fine adjustment, this constituting one of the features of the invention.

A tapered Pyrex casing is provided between the inlet conduit and chamber and preferably has an axis parallel to the aforesaid tube, there being provided a Pyrex outlet conduit below the casing. The inlet and outlet conduit are preferably coupled to the Pyrex casing at diametrally opposed positions.

An outlet conduit including a downwardly directed tapered tip portion or nozzle extends below the aforesaid chamber and two further Pyrex conduits are coupled to the Pyrex casing on opposite sides of the outlet conduit and to the aforesaid tube proximate the ends of the same.

Moreover there is contemplated the use of a tapered Teflon plug in the Pyrex casing and provided in accordance with another feature of the invention with two systems of passageways rotationally offset relative to each other and respectively associated with one of said further conduits, each system being adapted to couple said inlet conduit selectively to one of said further conduits and thus to one end of the aforesaid tube while the other system couples the other further conduit to the outlet conduit whereby the piston may be displaced in the tube due to the gravitational introduction of fluid into the same to cause a measured discharge of fluid through the aforesaid outlet conduit.

The stop cock employed in accordance with the invention constitutes a particular feature thereof. The stop cock may comprise, for example, a Pyrex casing having the shape of a truncated cone having an axis of symmetry shared in common with a Teflon plug rotatably disposed in the casing in fluid-tight relationship therewith.

This casing may be provided with two diametrally opposed openings and with two further openings on opposite sides of one of the first said openings. Preferably, all of these latter said openings are in rectilinear alignment and all of the noted openings lie in a common plane containing the axis of the Pyrex casing.

The plug is preferably provided with a coplanar arrangement of four passages connected in pairs. Each pair includes one diametrally disposed passage aligned with one of said further openings and one angularly disposed passage having an end aligned with said diametrally opposed openings and an end opening into the associated angularly disposed passage.

In further accordance with the invention, means is provided to rotate the plug whereby a selective distribution of fluid or other dispensing medium is enabled.

The foregoing objects and features of the invention, as well as various advantages thereof, will be apparent from the following detailed description of a preferred embodiment thereof as illustrated in the accompanying drawing in which:

FIGURE 1 is a perspective view of a volumetric dispensing apparatus provided in accordance with a preferred embodiment of the invention;

FIGURE 2 is a front view of the dispensing system of the apparatus illustrated in FIG. 1;

FIGURE 3 is a front view, on enlarged scale, of a portion of the apparatus illustrated in FIG. 2;

FIGURE 4 is a side view of the structure illustrated in FIG. 3;

Figure 5:
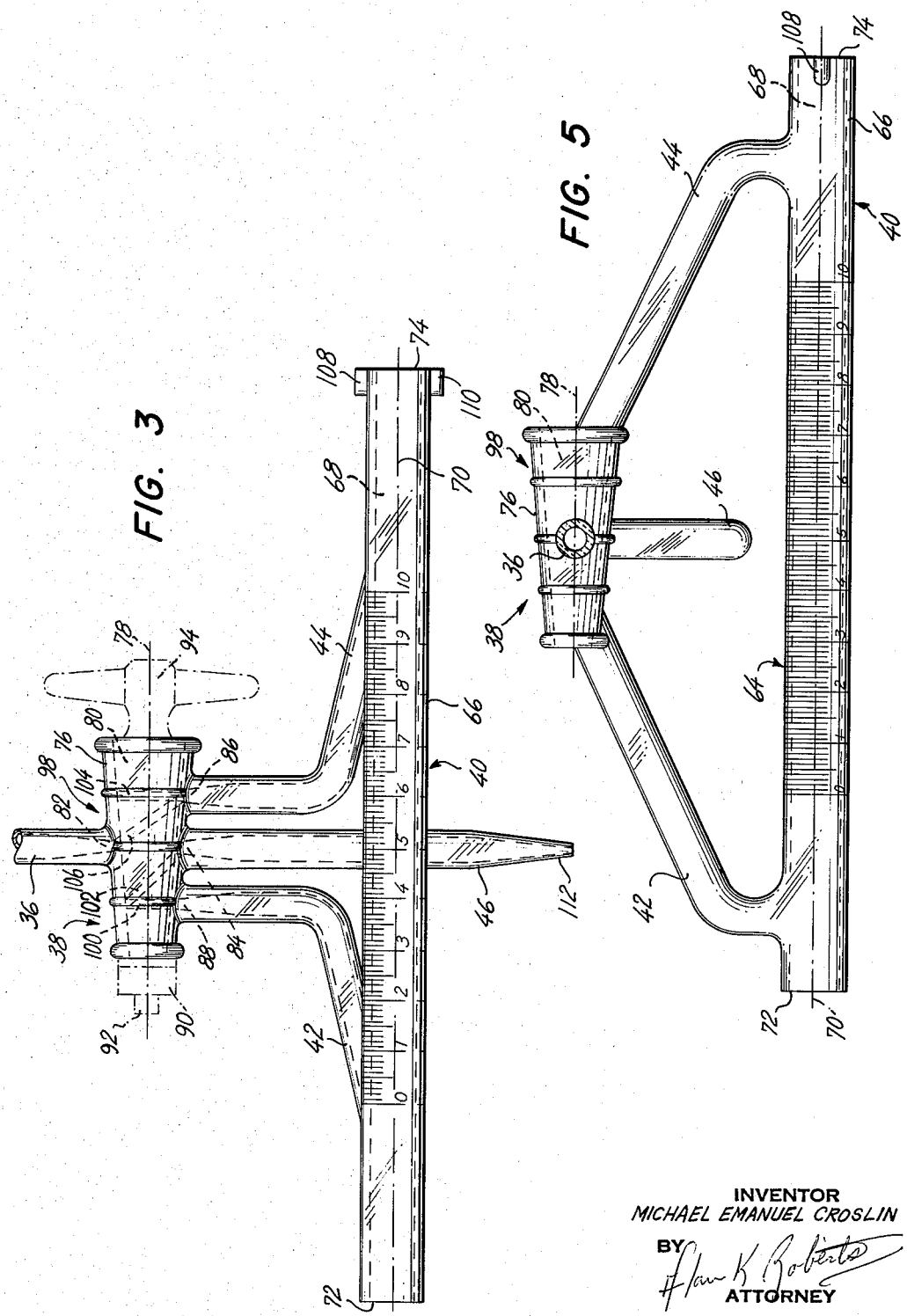
FIGURE 5 is a top view of the apparatus illustrated in FIGS. 3 and 4.

The volumetric dispensing apparatus of the invention as illustrated in the drawing comprises generally a stand 20 and a dispensing system 22.

The stand 20 comprises generally a base 24 fabricated, for example, of steel or iron but may be of any other suitable material such as wood or plastic.

Mounted on base 24 is an upright 26 which functions to support two adjustable clamping devices 28 and 30 which may be any conventional structure.

The dispensing system of the invention comprises, for example, a reservoir 32 having an inlet 34, this reservoir being preferably fabricated of a thermally stable material such as Pyrex. The reservoir constitutes a source of fluid under pressure, in this case gravitational pressure, and it may be replaced by any other suitable source of a fluid or other such dispensible material.

Beneath the reservoir 32 is provided a vertical inlet conduit 36 which is attached generally to a stop cock arrangement 38, the stop cock arrangement 38 being connected to a Pyrex chamber 40 the details of which will become hereinafter apparent. Said Pyrex chamber 40 is connected to the stop cock arrangement 38 by means of further Pyrex conduits 42 and 44. Additionally, a Pyrex outlet conduit 46 is connected to the stop cock arrangement 38. The purpose of said stop cock arrangement is to selectively associate opposite ends of the Pyrex chamber 40 with the inlet conduit 36, with said further conduits 42 and 44 and with said outlet conduit as will be shown.

At one end of the Pyrex chamber 40 is arranged a first Teflon cap member 48 which closes and seals this end of said chamber 40.

At the other end of the chamber 40 is an adjustment device which comprises a Teflon cap member 52 on which is threadably engaged a barrel 50 on which in turn is mounted a lock nut 54, the details of all of which will become apparent hereinafter.

A Teflon rod 56 having a knurled knob 58 thereon is provided for the purpose of adjusting the position of a Teflon stop 60, the function of which is to limit the travel of a piston 62 relative to a scale or scale means 64 for purposes of accurately dispensing or metering quantities of fluid from the reservoir 32 to a receiving device (not shown) as will be described.

The piston 62 is a free floating Pyrex piston the cross-section of which corresponds to the cross-section of the bore of chamber 40. The piston 62 moves from a position of rest as shown in solid lines through a number of operative positions as shown, for example, by the position indicated in dotted lines. The piston 62 effectively divides the chamber 40 into two sections A and B which are isolated in fluid-tight manner from one another by means of said piston. The axial length of the piston 62 is predetermined as will be explained in greater detail.

The structure of the chamber 40 and of the stop cock arrangement 38 will next be discussed in greater detail with reference to FIGS. 3–5 wherein it will be seen that the chamber 40 consists of a Pyrex tube 66 having an internal bore 68 which is a true bore tubing such that the bore is of substantially perfect circular configuration. The tubing and bore are symmetrical relative to an axis of symmetry 70 and the ends of the tube indicated at 72 and 74 are ground so that they define planes which are perpendicular to said axis 70.

The diameter of the bore, which is the internal diameter of the tube 66, is substantially equal to the outer diameter of the piston 62 (FIGS. 1 and 2) so that the latter may slide within the bore 66 while isolating the chamber A and B (FIGS. 1 and 2) in a substantially fluid-tight manner.

The tube 66 is preferably disposed in horizontal attitude in accordance with the preferred embodiment of the invention.

The stop cock arrangement 38 comprises a casing or housing 76 which is preferably of a truncated conical shape and which is fabricated preferably of a Pyrex. The casing 76 defines an axis of symmetry 78 which it shares in common with a rotatable Teflon plug 80 which is also of truncated conical shape.

The casing 76 is provided with two diametrally opposed openings 82 and 84 which are coaxially aligned. Opening 82 is connected with the inlet conduit 36 and opening 84 is connected with the outlet conduit 46.

Casing 76 is moreover provided with two further openings 86 and 88 which are disposed on opposite sides of the opening 84 and which are rectilinearly aligned therewith. The openings 82, 84, 86 and 88 are in coplanar disposition in a plane which contains the axis 78. Openings 82 and 84 are disposed in a plane which is perpendicular relative to said axis 78.

Plug 80 is held within the casing 76 by means of a lock nut 90 engaging an extension 92 of said plug and further by means of a handle 94 the purpose of which is to enable a rotation of the plug 80 within said casing 76.

Plug 80 is provided with two systems of passages or passageways 96 and 98 which are arranged on opposite sides of the plane in which openings 82 and 84 are positioned. System 96 comprises a diametrally aligned rectilinear passage 102. System 98 comprises a diametrally disposed passage 104 and an angularly disposed passage 106.

Passages 100 and 104 are arranged perpendicularly relative to the axis 78 whereas passages 102 and 106 are disposed at an angle relative thereto. Passages 102 and 106 extend axially along the plug 80 by a distance which enables them to couple inlet opening 82 to one of the further conduits 42 or 44 respectively.

In the illustration of FIGURE 3, fluid may flow from the inlet conduit 36 via opening 82 and thence via passage 106 to conduit 44 and thence into the end 74 of the tube 66 inasmuch as conduit 44 is connected to the tube 66 proximate said end 74.

Fluid forced from the other end of the tube 66 by piston 62 will flow via conduit 42 through opening 88 into passage 100 and thence via passage 102 into outlet conduit 46. A detail description of how this operates for dispensing metered amounts of fluid or the like follows hereinafter.

Other features to be noted in FIGS. 3–5 are the keys 108 and 110 attached to tube 66 at end 74 whereby a fixed connection can be made to the tube 66 as will hereinafter be described, and the tapered tip or nozzle portion 112 of the outlet conduit 46 by means of which fluid is dispensed to a receiving device such as a beaker or the like.

Still another feature to be noted in FIG. 5 is indicated diagrammatically in the form of the scale means 64, this scale means being constituted by an etched scale on the tube 66 itself or a sheet or the like appropriately marked and disposed adjacent and behind the tube 66 to afford some means of performing a measuring operation.

Figure 6:
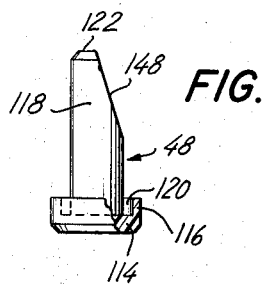
FIGURE 6 is a side view, partially broken away, of a cap member employed in the aforenoted apparatus.

The end cap member 48 referred to above is illustrated in greater detail in FIG. 6 wherein it is seen that this member includes a head 114 having annular flange 116 which defines together with main body or plug 118 of said cap member an annular groove 120. The plug 118 extends into the bore of the tube 66 to a determinable extent and the extreme end of the tube 66 is accommodated within the annular groove 120.

The distance between the end 122 of the plug 118 and the beginning of the scale means 64 is illustrated by reference D1 in FIG. 2. This distance is exactly equal to the axial length of the piston 62 so that when the piston 62 is at rest against the end of the plug 118 it will align exactly with the beginning of said scale.

The cap member 52 forming a part of the adjustment device referred to hereinabove is shown in axial section in FIG. 7 and is seen to comprise a main body 124 having therein a smooth bore 126 which when the cap member 52 is seated on the corresponding end of the tube 66 will be coaxially aligned therewith. Cap member 52 is moreover provided with a concentric flange 128 defining with the main body 124 an annular groove 130 within which is accommodated the end 74 (see FIG. 3) of the tube 66. The end 132 of the main body 126 (FIG. 7) is provided with slots diametrally disposed and intended to engage with the keys 108 and 110 of FIG. 3 so that a fixed rotational relationship between the tube 66 and the cap member 52 is assured.

Figure 7:
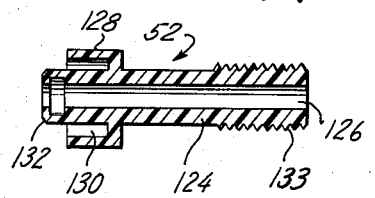
FIGURE 7 is an axial section of a cap member constituting a part of the adjustment device employed in accordance with the invention.
Figure 8:
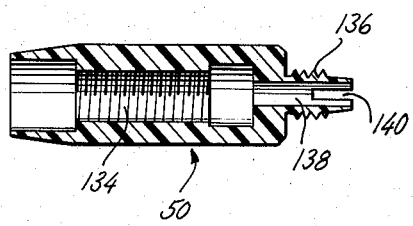
FIGURE 8 is an axial section of a barrel employed in conjunction with the apparatus of FIG. 7 in the adjusting device of the invention.

FIG. 8 illustrates in axial section the barrel 50 of the invention, said barrel being provided with an interior thread 134 which is intended to engage on the exterior thread 133 provided on the main body 124 of the cap member 52 as illustrated in FIG. 7.

There is provided an externally threaded cylindrical extension 136 in coaxial alignment with the barrel 50, said extension 136 being provided with a smooth bore 138 the purpose of which will become hereinafter apparent. Extension 136 is moreover provided with axially open diametrally opposed slots 140 which enables the extension 136 to function as a lock member as will be seen.

Figure 9:
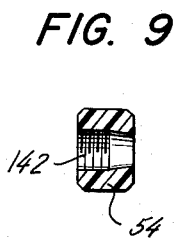
FIGURE 9 is a lock nut, in axial section, as is employed with the structures of FIGS. 7 and 8.

FIG. 9 illustrates the lock nut 54 provided with an interior thread 142 intended to engage the exterior thread on cylindrical extension 136 on the barrel 50 (FIG. 8). Said lock nut 54 serves to compress the cylindrical extension 136, as permitted by the inclusion of the slots 140 therein, whereby these two elements are cooperatively enabled to perform a locking operation.

Figure 10:
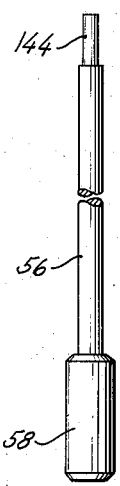
FIGURE 10 illustrates in diagrammatic side view the rod and knob employed in accordance with the invention.

Extending through the bores in the lock nut 54 and in the barrel 50 as well as in the cap member 52 is the Teflon rod 56 illustrated in greater detail in FIG. 10. The knob 58 is diagrammatically indicated in FIG. 10 this knob preferably being knurled so as to enable a ready grasping thereof.

Figure 11:
FIGURE 11 is an end view of the Teflon stop employed in accordance with the invention.
Figure 12:
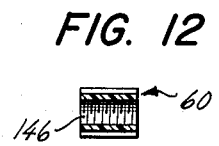
FIGURE 12 is an axial section of the component illustrated in FIG. 11.

As is apparent in FIG. 10, the rod 56 is provided with a coaxial extension 144 the purpose of which is to penetrate and support the Teflon stop 16 which is illustrated in detail in FIGS. 11 and 12. In these figures it is seen that the stop 16 is provided with a bore 146 into which said extension 144 penetrates.

It is also apparent in FIGS. 11 and 12 that the stop 60 is provided with a non-circular cross-section so that the flow of fluid about the stop 60 within the tube 66 is not impeded.

The non-circular cross-section of the Teflon stop 60 illustrated in FIGS. 11 and 12 may also be applied to the plug 118 in FIG. 6. Alternatively, plug 118 may be provided with the chamfer 148 the purpose of which is also to provide for an unimpeded flow of fluid from or to the extreme end of the tube 66.

From what has been stated above it will now generally appear that the invention according to one embodiment thereof, contemplates the provision of a volumetric dispensing or metering apparatus which comprises a source of fluid under pressure, there being operatively associated with this source of reciprocating means which includes two ports interchangeably operable as input and output ports, this reciprocating means being responsive to the receiving of a fluid under pressure via one of the aforesaid ports to discharge fluid via the other of the said ports, there being further provided means adapted to store the fluid thusly received for a subsequent discharge.

The invention further contemplates the provision of output means, there being further provided means for interchangeably connecting the aforesaid ports to the source and to the output means, the invention moreover contemplating the use of adjustment means coupled to the reciprocating means to limit the amount of fluid which can be received and thereby to control the amount of fluid discharged.

In connection with the aforesaid apparatus, the general operation indicated above is more specifically as follows:

Liquid stored in the reservoir 32 passes into the inlet conduit 36 and thence to the stop cock arrangement 38. With the plug 80 arranged as illustrated in FIG. 3 the fluid passes to the conduit 44 and then to the end 74 of the tube 66. The piston 62 within the tube 66 is forced in through tube 66 and forces before it the fluid previously contained, for example, in section A of the chamber 40. This fluid passes via the tube 42 and, in FIG. 3, passage 100 to the passage 102 and thence into the outlet conduit 46 to be discharged via the tapered nozzle or tip portion 112.

In the meantime, the amount of fluid which is discharged from the tip 112 is replenished within the chamber 40 or the tube 66 by fluid passing from the inlet conduit 36 via passages 106 into the tube 44 as aforesaid.

This operation may then be reversed by a 180° rotation of the handle 106 such that the alignment of the passage systems 96 and 98 are interchanged. Thereafter the floating piston 62 will reverse its direction of travel and fluid will be forced from the tube 66 via the conduit 44 and via passages 106 and 104 the attitudes of which have been reversed so that connection is now made from the conduit 44 to the conduit 46. At the same time, fluid is passed from the inlet conduit 36 via reversed passage 102 into the conduit 42 and thence into the chamber 40.

One of the features of the invention is the adjustment device or means which enables a coarse adjustment of the position of the rod 56 within the chamber 40 by an unloosening of the lock nut 50 and a manual sliding in or out of the rod 56. Another feature consists of the fine adjustment which is then possible between the barrel 50 and the cap member 52 in accordance with the details which have been supplied above.

This coarse adjustment in combination with the fine adjustment enables a very precise positioning of the stop 60 which, therefore, stops the travel of the piston 62 at a very precisely selected position. Thereby a very precise control of the charging and discharging operations is enabled in accordance with the invention.

Another feature of the invention resides in the stop cock arrangement 38 which enables a selective coupling of the fluid inlet conduit 36 with one of the further conduits 42 and 44 whereby a charge is loaded into the chamber 40 so as to force the piston 62 to slide in a direction which accommodates this charge while at the same time forcing the previously charged fluid from the chamber 40 via one of the conduits 42 and 44 and via the outlet conduit 46.

There will now be obvious to those skilled in the art many modifications and variations of the structure set forth above. These modifications and variations will not, however, depart from the scope of the invention if defined by the following claims.

What is claimed is:

1. Apparatus comprising an inlet conduit adapted for the supply of fluid, a chamber proximate said inlet conduit, said chamber being in the form of a tube having a bore of predetermined size and having two oppositely disposed ends, scale means operatively associated with said chamber intermediate said ends, a first cap member on one end of said tube and sealing the same, a free piston in said tube and having a size corresponding to that of said bore, said piston being slidable in said bore and dividing said chamber into two sections in substantially fluid-tight manner adjustment, means on and sealing the other end of said tube and including a stop within said chamber and adjustable relative to said scale means, an outlet conduit, two further conduits coupled to said tube proximate the ends of the same, and means to couple said inlet conduit selectively to one of said further conduits and thus to one end of said tube while coupling the other further conduit to said outlet conduit; said adjustment means further including a rod supporting said stop and extending outside said chamber, an adjustment member slidably supporting said rod for coarse adjustment, a locking member for locking said rod to said adjustment member, and a cap member on the said other end of said tube and threadably supporting the adjustment member for fine adjustment of said rod.

2. A pipette comprising an inlet conduit adapted for the gravitational supply of fluid, a chamber below said inlet conduit, said chamber having two oppositely disposed ends, scale means operatively associated with said chamber intermediate said ends, a first cap member on one of said ends and sealing the same, a free floating piston in and dividing said chamber into two isolated sections, an adjustment device on and sealing the other end of said chamber, said adjustment device including a cap member on said other end, the latter cap member including a threaded extension disposed externally of said chamber, an internally threaded barrel threadably and adjustably engaged on said extension and including an externally threaded cylindrical extension having diametral slots whereby to constitute an adjustable friction locking member, a locking nut engaged on said cylindrical extension to compress the same to effect a locking operation, a rod extending through the latter said cap member, barrel and cylindrical extension and being adjustably lockable within the latter, a stop on said rod within said chamber and adjustable relative to said scale means with a coarse adjustment of said rod by means of said locking member and with a fine adjustment by threaded adjustment of said barrel on the threaded extension of the latter said cap member, said piston being displaceable between the first cap member and said stop, a casing between said inlet conduit and chamber, an outlet conduit below said casing, said inlet and outlet conduits being coupled to said casing at diametrally opposed positions, said outlet conduit including a downwardly directed tip portion extending below said chamber, two further conduits coupled to said Pyrex casing on opposite sides of said outlet conduit and being coupled to said chamber proximate the ends of the same, and a rotatable plug in said casing and provided with two systems of passageways rotationally offset relative to each other and respectively associated with one of said further conduits, each system being adapted to couple said inlet conduit to the associated further conduit and thus to one end of said chamber while the other system couples the other further conduit to said outlet conduit, and an adjustable stand supporting said chamber and casing.

3. A pipette comprising a stand including a base, an upright on said base, and adjustable clamping means on said upright; and a dispensing system comprising a vertical inlet conduit supported in operative position by said clamping means and adapted for the gravitational supply of fluid, a Pyrex chamber below said vertical inlet conduit, said chamber being in the form of a horizontal tube having a circular bore of predetermined diameter and defining an axis of symmetry, said tube having two oppositely disposed ends, scale means operatively associated with said chamber parallel to said axis and intermediate said ends, a first Teflon cap member on one end of said tube and sealing the same and including a plug extending into said tube to a position short of said scale means by a determinable distance, a free floating Pyrex piston in said tube and having a diameter corresponding to that of said bore, said piston being slidable in said bore and dividing said chamber into two sections in substantially fluid-tight manner, said piston having an axial length corresponding to said determinable distance and being thereby adapted to fit between said plug and scale means, an adjustment device on and sealing the other end of said tube, said adjustment device including a Teflon cap member on said other end, the latter said cap member having a bore coaxial with said tube and including a threaded extension coaxial with said tube and disposed externally thereof, an internally threaded Teflon barrel threadably and adjustably engaged on said extension and including an externally threaded cylindrical Teflon extension having a bore coaxial with said tube and further having diametral slots whereby to constitute an adjustable friction locking member, a Teflon locking nut engaged on said cylindrical extension to compress the same to effect a locking operation, a Teflon rod extending through the latter said cap member, barrel and cylindrical extension and being adjustably lockable within the latter, a knob on said rod externally of said chamber, a Teflon stop on said rod within said chamber and adjustable relative to said scale means with a coarse adjustment of said rod by said knob and locking member and with a fine adjustment by threaded adjustment of said barrel on the threaded extension of the latter said cap member, said piston being displaceable between said plug and stop, a Pyrex outlet conduit including a downwardly directed tapered tip portion extending below said chamber, two further Pyrex conduits coupled to said tube proximate the ends of the same, and means to couple said inlet conduit selectively to one of said further conduits and thus to one end of said tube while coupling the other further conduit to said outlet conduit whereby the piston is displaced in said tube due to the gravitational introduction of fluid into said tube and causes a measured discharge of fluid through said outlet conduit.

4. A pipette comprising a stand including a base, an upright on said base, and adjustable clamping means on said upright; and a dispensing system comprising a vertical inlet conduit supported in operative position by said clamping means and adapted for the gravitational supply of fluid, a Pyrex chamber below said vertical inlet conduit, said chamber being in the form of a horizontal tube having a circular bore of predetermined diameter and defining an axis of symmetry, said tube having two oppositely disposed ends, scale means operatively associated with said chamber parallel to said axis and intermediate said ends, a first Teflon cap member on one end of said tube and sealing the same and including a plug extending into said tube to a position short of said scale means by a determinable distance, a free floating Pyrex piston in said tube and having a diameter corresponding to that of said bore, said piston being slidable in said bore and dividing said chamber into two sections in substantially fluid-tight manner, said piston having an axial length corresponding to said determinable distance and being thereby adapted to fit between said plug and scale means, means on and sealing the other end of said tube including a stop within said chamber and adjustable relative to said scale means, said piston being displaceable between said plug and stop, a tapered Pyrex casing between said inlet conduit and chamber and having an axis parallel to said tube, a Pyrex outlet conduit below said casing, said inlet and outlet conduits being coupled to said Pyrex casing at diametrically opposed positions, said outlet conduit including a downwardly directed tapered tip portion extending below said chamber, two further Pyrex conduits coupled to said Pyrex casing on opposite sides of said outlet conduit and being coupled to said tube proximate the ends of the same, and rotatable tapered Teflon plug in said Pyrex casing and provided with two systems of passageways rotationally offset relative to each other and respectively associated with one of said further conduits, each system being adapted to couple said inlet conduit to the associated further conduit and thus to one end of said tube while the other system couples the other further conduit to said outlet conduit whereby the piston is displaced in said tube due to the gravitational introduction of fluid into said tube and causes a measured discharge of fluid through said outlet conduit.

5. A pipette comprising an inlet conduit adapted for the gravitational supply of fluid, a chamber proximate said inlet conduit, said chamber being in the form of a tube having a circular bore of predetermined diameter and defining an axis of symmetry, said tube having two oppositely disposed ends defining planes at right angles to said axis, scale means operatively associated with said chamber parallel to said axis and intermediate said ends, a first cap member on one end of said tube and sealing the same and including a plug extending into said tube to a position short of said scale means by a determinable distance, a free floating piston in said tube and having a diameter corresponding to that of said bore, said piston being slidable in said bore and dividing said chamber into two sections in substantially fluid-tight manner, said piston having an axial length corresponding to said determinable distance and being thereby adapted to fit between said plug and scale means, an adjustable device on and sealing the other end of said tube, said adjustment device including a cap member on said other end, the latter said cap member having a bore coaxial with said tube and including a threaded extension coaxial with said tube and disposed externally thereof, an internally threaded barrel threadably and adjustably engaged on said extension and including an externally threaded cylindrical extension having a bore coaxial with said tube and further having diametral slots whereby to constitute an adjustable friction locking member, a locking nut engaged on said cylindrical extension to compress the same to effect a locking operation, a rod extending through the latter said cap member, barrel and cylindrical extension and being adjustably lockable within the latter, a knob on said rod externally of said chamber, a stop on said rod within said chamber and adjustable relative to said scale means with a coarse adjustment of said rod by said knob and locking member and with a fine adjustment by threaded adjustment of said barrel on the threaded extension of the latter said cap member, said piston being displaceable between said plug and stop, a tapered casing proximate said inlet conduit and chamber and having an axis parallel to said tube, an outlet conduit, said casing, said inlet and outlet conduits being coupled to said casing at diametrally opposed positions, two further conduits coupled to said casing on opposite sides of said outlet conduit and being coupled to said tube proximate the ends of the same, and a rotatable tapered plug in said casing and provided with two systems of passageways rotationally offset relative to each other and respectively associated with one of said further conduits, each system being adapted to couple said inlet conduit to the associated further conduit and thus to one end of said tube while the other system couples the other further conduit to said outlet conduit.

6. A pipette as claimed in claim 5 comprising a fluid reservoir coupled to said inlet conduit.

7. A pipette comprising a stand including a base, an upright on said base, and adjustable clamping means on said upright; and a dispensing system comprising a vertical inlet conduit supported in operative position by said clamping means and adapted for the gravitational supply of fluid, a Pyrex chamber below said vertical inlet conduit, said chamber being in the form of a horizontal tube having a circular bore of predetermined diameter and defining an axis of symmetry, said tube having two oppositely disposed ends defining planes at right angles to said axis, scale means operatively associated with said chamber parallel to said axis and intermediate said ends, a first Teflon cap member on one end of said tube and sealing the same and including a plug extending into said tube to a position short of said scale means by a determinable distance, a free floating Pyrex piston in said tube and having a diameter corresponding to that of said bore, said piston being slidable in said bore and dividing said chamber into two sections in substantially fluid-tight manner, said piston having an axial length corresponding to said determinable distance and being thereby adapted to fit between said plug and scale means, an adjustment device on and sealing the other end of said tube, said adjustment device including a Teflon cap member on said other end, the latter said cap members having a bore coaxial with said tube and including a threaded extension coaxial with said tube and disposed externally thereof, an internally threaded Teflon barrel threadably and adjustably engaged on said extension and including an externally threaded cylindrical Teflon extension having a bore coaxial with said tube and further having diametral slots whereby to constitute an adjustable friction locking member, a Teflon locking nut engaged on said cylindrical extension to compress the same to effect a locking operation, a Teflon rod extending through the latter said cap member, barrel and cylindrical extension and being adjustably lockable within the latter, a knob on said rod externally of said chamber, a Teflon stop on said rod within said chamber and adjustable relative to said scale means with a coarse adjustment of said rod by said knob and locking member and with a fine adjustment by threaded adjustment of said barrel on the threaded extension of the latter said cap member, said piston being displaceable between said plug and stop, a tapered Pyrex casing between said inlet conduit and chamber and having an axis parallel to said tube, a Pyrex outlet conduit below said casing, said inlet and outlet conduits being coupled to said Pyrex casing at diametrally opposed positions, said outlet conduit including a downwardly directed tapered tip portion extending below said chamber, two further Pyrex conduits coupled to said Pyrex casing on opposite sides of said outlet conduit and being coupled to said tube proximate the ends of the same, and a rotatable tapered Teflon plug in said Pyrex casing and provided with two systems of passageways rotationally offset relative to each other and respectively associated with one of said further conduits, each system being adapted to couple said inlet conduit to the associated further conduit and thus to one end of said tube while the other system couples the other further conduit to said outlet conduit whereby the piston is displaced in said tube due to the gravitational introduction of fluid into said tube and causes a measured discharge of fluid through said outlet conduit.

8. A pipette as claimed in claim 7 wherein the first said cap member includes a head including an annular flange which defines with said plug an annular groove into which said one end of the tube extends.

9. A pipette as claimed in claim 7 wherein the plug and stop have non-circular cross-sections whereby to permit the flow of fluid thereby.

References Cited by the Examiner

UNITED STATES PATENTS

| 813,977 | 2/1906 | Konig | 222—158 |
|---|---|---|---|
| 1,188,085 | 6/1916 | Krupp | 137—625.29 |
| 1,280,481 | 10/1918 | Hutchinson | 222—158 |
| 1,784,892 | 12/1930 | Duden | 137—625.29 |
| 2,158,102 | 5/1939 | Betzold et al. | 23—259 |
| 2,406,239 | 8/1946 | Morgenroth | 222—250 X |
| 2,559,317 | 7/1951 | Perlstein | 248—125 |
| 2,576,747 | 11/1951 | Bryant | 222—250 |
| 2,868,575 | 1/1959 | Hawxhurst. | |
| 3,138,290 | 6/1964 | Coulter | 222—250 X |
| 3,138,294 | 6/1964 | Coulter et al. | 222—158 X |

LOUIS J. DEMBO, *Primary Examiner.*

NORMAN L. STACK, *Assistant Examiner.*